United States Patent [19]

Nelson et al.

[11] Patent Number: 4,792,203

[45] Date of Patent: Dec. 20, 1988

[54] OPTICAL FIBER DISTRIBUTION APPARATUS

[75] Inventors: Calvin G. Nelson, Northborough, Mass.; Mark Anton, Minneapolis, Minn.

[73] Assignee: ADC Telecommunications, Inc., Minneapolis, Minn.

[21] Appl. No.: 906,804

[22] Filed: Sep. 12, 1986

Related U.S. Application Data

[63] Continuation-in-part of Ser. No. 821,234, Jan. 22, 1986, abandoned, which is a continuation-in-part of Ser. No. 776,822, Sep. 17, 1985, abandoned.

[51] Int. Cl.⁴ .......................... G02B 6/00; G02B 6/36
[52] U.S. Cl. ............................. 350/96.20; 350/96.10; 350/96.22
[58] Field of Search ................ 350/96.20, 96.21, 96.22

[56] References Cited

U.S. PATENT DOCUMENTS

| | | | |
|---|---|---|---|
| 4,277,135 | 7/1981 | Schrott et al. | 350/96.21 |
| 4,359,262 | 11/1982 | Dolan | 350/96.20 |
| 4,502,754 | 3/1985 | Kawa | 350/96.20 |
| 4,585,303 | 4/1986 | Pinsard et al. | 350/96.20 |
| 4,595,255 | 1/1986 | Bhatt et al. | 350/96.20 |
| 4,630,886 | 12/1986 | Lauriello et al. | 350/96.20 |

FOREIGN PATENT DOCUMENTS

| | | |
|---|---|---|
| 0116480 | 8/1984 | European Pat. Off. . |
| 0149250 | 7/1985 | European Pat. Off. . |
| 0146478 | 8/1985 | European Pat. Off. . |
| 0211208 | 2/1987 | European Pat. Off. . |
| 2735106 | 2/1979 | Fed. Rep. of Germany . |
| 59-74523 | 4/1984 | Japan . |
| 60-169811 | 9/1984 | Japan . |

Primary Examiner—William L. Sikes
Assistant Examiner—Akm E. Ullah
Attorney, Agent, or Firm—Merchant, Gould, Smith, Edell, Welter & Schmidt

[57] ABSTRACT

The present invention organizes optical fibers from a trunk cable for connection to fibers from various distribution cables. The apparatus includes a housing having a plurality of trays swingable from a storage position inside the housing to an access position in front of the housing. Each tray includes a spool for holding excess fiber from the trunk cable and a spool for holding fiber from a pigtail cable. In addition, various routing paths are provided to include a path for holding excess fiber from a distribution cable of a pigtail cable leading to a distribution cable. Connections between the fiber of the trunk cable and the pigtain cable and between the pigtail cable and the jumper leading to the distribution cable are attached to the tray and readily movable between the storage and access position. The apparatus may also be used simply to store fiber.

29 Claims, 11 Drawing Sheets

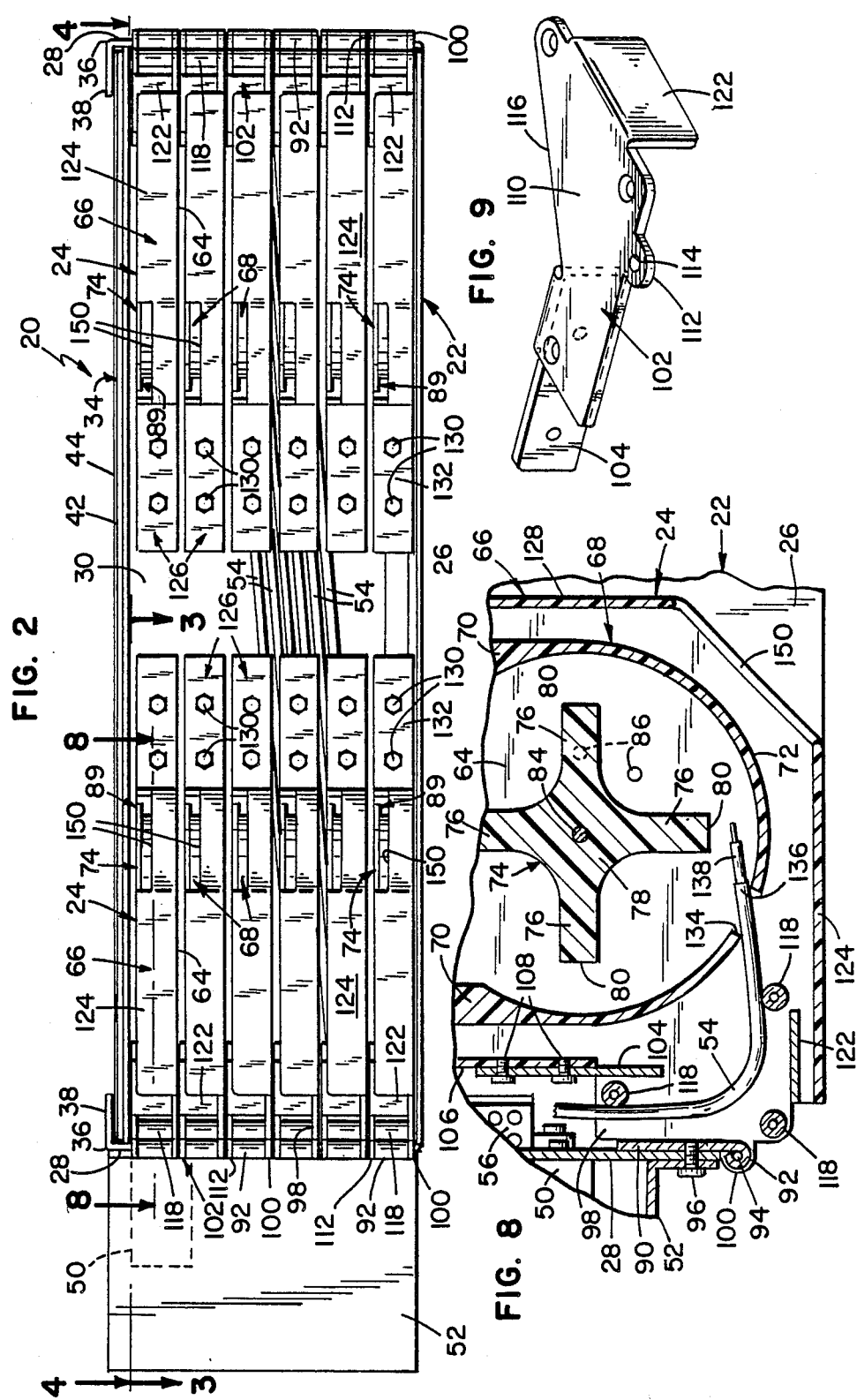

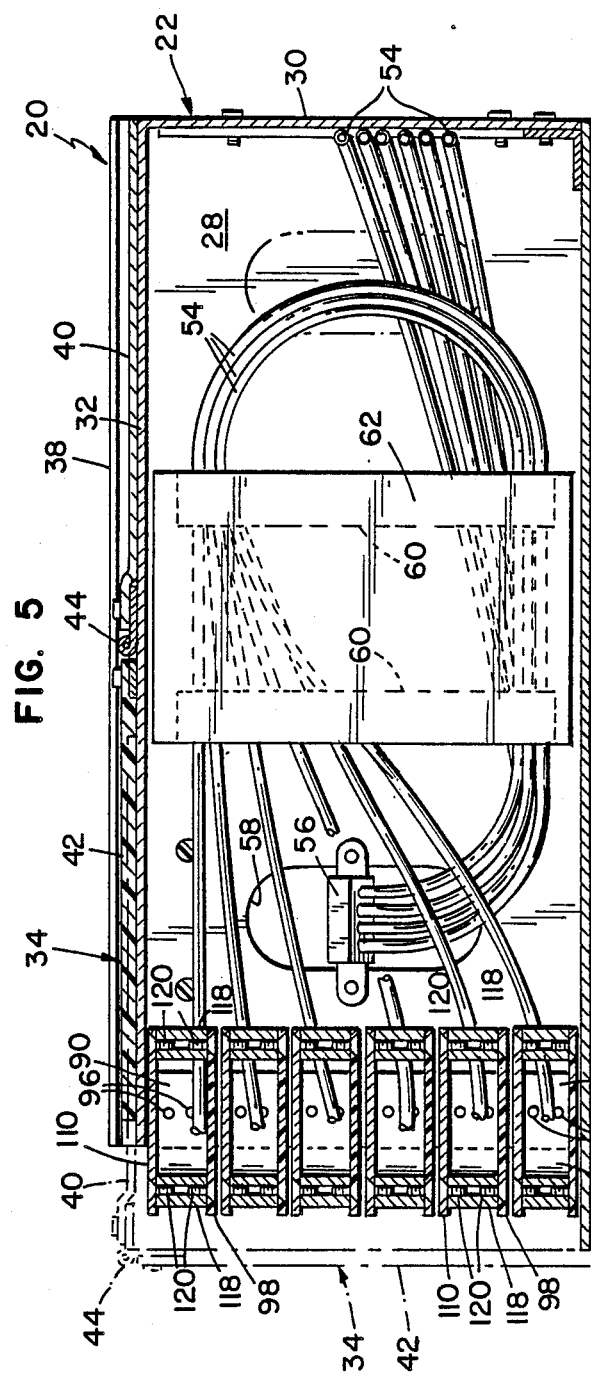
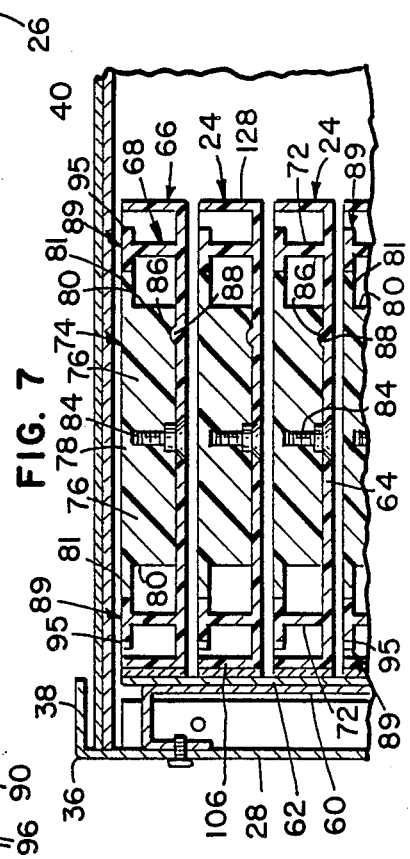

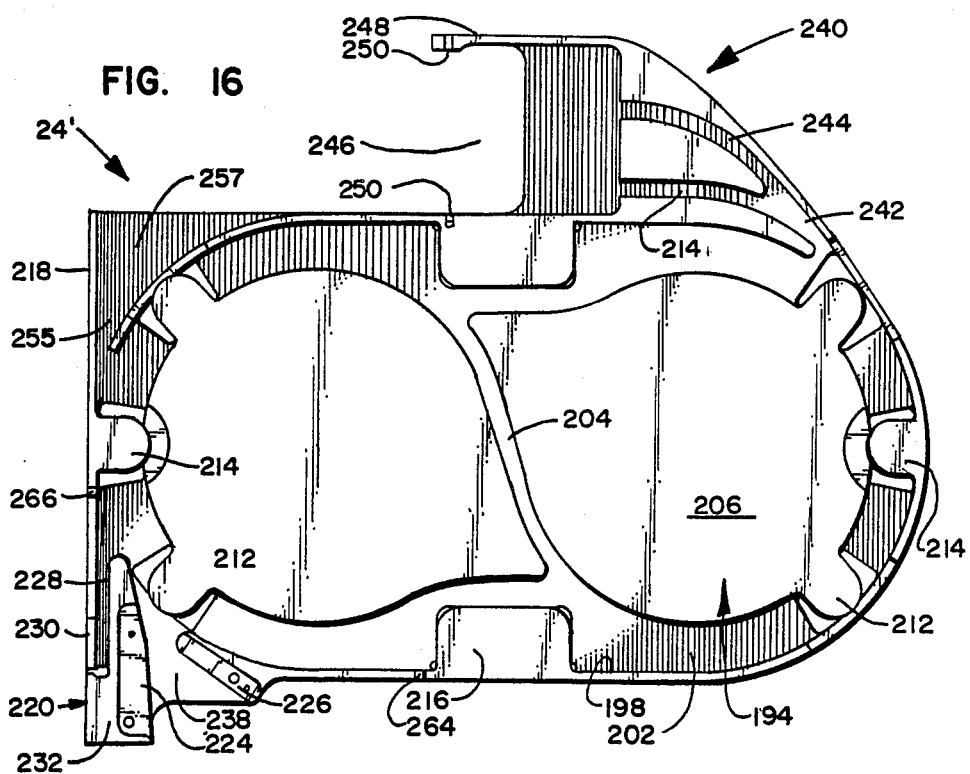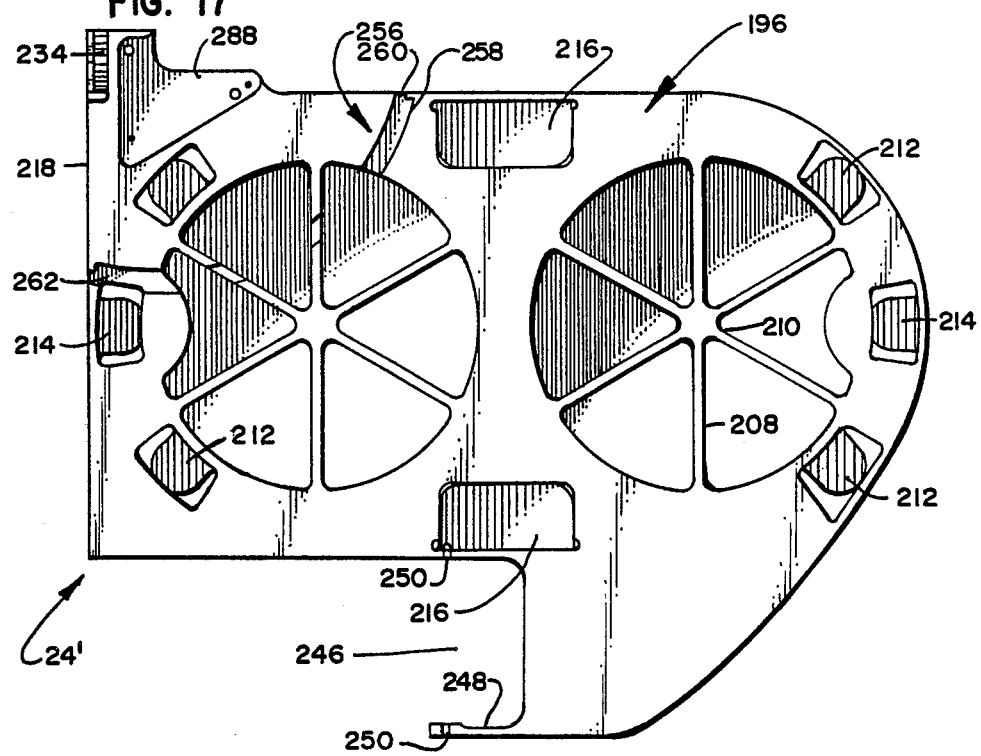

OPTICAL FIBER DISTRIBUTION APPARATUS

The present application is a continuation-in-part of Ser. No. 821,234, filed Jan. 22, 1986, now abandoned which is a continuation-in-part of Ser. No. 776,822 filed Sept. 17, 1985, now abandoned.

FIELD OF THE INVENTION

The present invention is directed to distribution equipment for fiber optic cables. The equipment has particular application in the communications industry with respect to storing fibers or storing fibers from a trunk cable which interconnect with fibers from individual distribution cables. The invention provides for orderly connection between and distribution of fiber optic cables and for storage of excess cable lengths.

BACKGROUND OF THE INVENTION

Fiber optics is a relatively new technology, but is increasingly replacing hard wire electrical cable, especially for communications applications. In the telephone industry, a trunk cable comes into a central office and is connected to a number of distribution cables which lead to user installations. Distribution panels provide a way to permanently connect the fibers from a trunk line to one end of a connector. Fibers from the distribution cables are then connected to the other end of the connector. It is important, however, because of the large number of fibers being connected that there is a method for organizing the connections and the cables.

Panels for use in organizing the distribution of fibers from a trunk line to distribution lines are known. In known panels, however, the splice from a fiber in the trunk cables to a fiber in a pigtail cable is made at a different subassembly from the connection of a pigtail fiber to the fiber of a distribution cable. Also, known panels do not have a planned design for storing excessive lengths of fiber. Consequently, known panels are plagued with a "rat's nest" of excess fiber and cable. The present distribution apparatus eliminates such problem and provides a number of other novel features.

SUMMARY OF THE INVENTION

The present invention is directed to distribution apparatus for storing optical fibers. The apparatus includes a housing having members which define a storage space, a plurality of trays with each having an endless main passage for routing at least one of the optical fibers therein, and means for movably attaching each of the trays to the housing such that the trays may be moved between a storage position in the storage space and an access position generally outside the storage space. Each of the trays of the present apparatus has an outer wall and an entry opening in the outer wall through which said one optical fiber is routed to enter or to exit with respect to the main passage.

In an alternate embodiment, the apparatus includes mechanism for interconnecting a fiber from a trunk cable with a fiber from a pigail cable or a distribution cable.

In another embodiment, the distribution apparatus includes a housing with an openable front wall for exposing the storage space. A plurality of trays are swingably attached to the housing. Each tray is movable between the storage space and a space substantially outside the storage space. A mechanism is attached to the housing for routing a fiber from the trunk cable to each of the trays. Each tray includes a pigtail fiber. Each tray also includes a spool for storing any excess or slack portion of the pigtail fiber and a second spool for storing any excess or slack portion of the trunk cable fiber. A splice between the trunk cable fiber and the pigtail fiber is made in a region between the first and second spools and attached to the tray. The other end of the pigtail is connected to a connector fastened to a bulkhead attached to the outside of the tray. A fiber from a distribution cable connects to the connector to complete the interconnection. Storage space is available in the tray for any excess or slack portion of the distribution cable.

In still another embodiment, the distribution apparatus includes a housing defining a storage space wherein the storage space includes an openable front wall generally along the upper portion of the housing and a drawer along the lower portion of the housing. As in the previously discussed embodiment, a plurality of trays are swingably attached to the housing and may be moved between the storage space and space substantially outside the storage space. The drawer may also be moved from its regular storage location by sliding it forwardly to expose its contents for easy accessibility. First fibers from a trunk cable are routed into the housing to the drawer. The first fibers are connected to first ends of pigtail fibers with splicing mechanism in the drawer. The pigtail fibers are routed to the plurality of trays which provide a storage capability, as necessary, as well as channels for directing the pigtail fiber to connecting mechanism attached to each tray. Second fibers from distribution cables are connected at the connecting mechanism to the pigtail fibers. The second fibers are routed through a second channel in each tray for storage in each tray, as necessary, before exiting from the housing. Alternatively, it is sometimes desirable to route the first fibers from the trunk cable directly into the trays for connection to the connecting mechanism and the second fibers. In such instance, the pigtail fiber and the drawer are not used.

The apparatus is particularly advantageous in that it provides an organized method for connecting an outside plant trunk cable with fiber termination equipment. Individual trays and, in the case of the latter embodiment, a drawer having both storage and access positions are provided with structure to receive excess trunk and distribution cable fiber and to hold a pigtail fiber. The apparatus provides for splicing and connecting mechanisms. The trays swing between a storage position and an access position and the drawer slides between a storage position and an access position to allow service people easy access for installation and repair.

Of further advantage in the one embodiment is the locating of the splice between the trunk cable fiber and the pigtail fiber as a part of the same tray subassembly as the connector forming the connection between the pigtail fiber and the fiber of the distribution cable. The swingable trays provide for access to both the splice and the connector without disturbing unneeded fibers. Furthermore, the trays are completely accessible from the front of the stacked housings.

Of equal advantage in another embodiment is the locating of the splice between the trunk cable fiber and the pigtail fiber in a drawer subassembly immediately beneath the storage region in which the stacked trays are located. The pigtail fibers lead from the drawer up to the tray subassembly where they are connected to the fibers of the distribution cable. Again, the sliding drawer and the swingable trays provide for easy access from the front of the housing to the splices and connectors.

Yet another advantage in one of the embodiments is that a pigtail or other cable or fiber may simply be stored in one or more drawers, without any interconnections made. Of even greater advantage is that two or more stacked drawers may be used in combination for the storage of such fiber. In this application, a removable bulkhead plate functions to hold two or more trays vertically aligned so that one tray is not moved with respect to the other thereby bending or stressing a fiber in an unacceptable fashion.

Other advantageous features include easy installation of trays and equally easy replacement of a tray; controlled bend radii for variously routed optical fibers; hold down tabs in each tray for holding the various fibers in place; a clamp for holding the trunk or outside plant cable to the housing; and conduits or tubes for readily routing fibers from the trunk line to a particular tray for splicing to the pigtail therein.

Additional features and objects of the present invention will be apparent from the detailed description of a preferred embodiment presented hereafter with reference to the following drawings.

BRIEF DESCRIPTION OF THE DRAWINGS

FIG. 2 is a front elevational view with the front wall in an open position;

FIG. 5 is a cross-sectional view taken along line 5—5 of FIG. 4;

FIG. 7 is a cross-sectional view taken along line 7—7 of FIG. 3;

FIG. 8 is a cross-sectional view taken along line 8—8 of FIG. 2;

FIG. 9 is a perspective view of a representative support member for component of a tray which may be fastened to the housing to allow the tray to rotate between storage and access positions;

FIG. 16 is a top plan view of a tray in accordance with the alternate embodiment; and FIG. 17 is a bottom view of the tray of FIG. 16;

DETAILED DESCRIPTION OF THE PREFERRED EMBODIMENT

Figure 1:
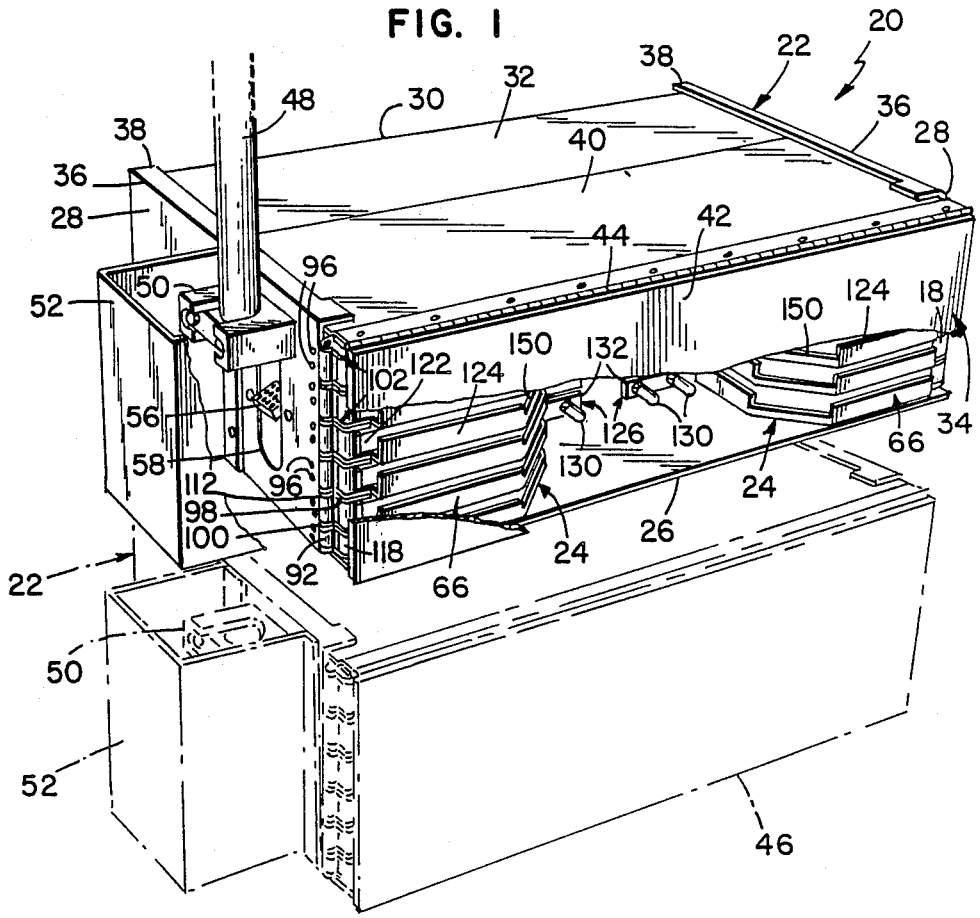
FIG. 1 is a perspective view of one housing in accordance with the present invention exploded above another housing, the upper housing having a portion of the front wall removed.

Referring now to the drawings wherein like reference numerals designate identical or corresponding parts throughout the several views, and more particularly to FIG. 1, distribution apparatus for cross connecting optical fibers from a trunk cable to optical fibers of a plurality of distribution cables is designated generally by the numeral 20. Apparatus 20 includes a housing 22 for supporting at least one tray 24. Housing 22 includes a plurality of members which define a storage space. Housing 22 is shown having a bottom wall 26, side walls 28, a back wall 30 (see FIG. 5), a top wall 32, and a front wall 34 having an openable cover 42. Housing 22 swingably supports a plurality of trays 24 for connecting and organizing trunk cable fibers, pigail fibers and distribution cable fibers.

It is understood that although a cable is generally a plurality of fibers, apparatus 20 and its alternates may be used to organize or store either a fiber or a cable depending on the application and that with respect to scope of use in apparatus 20 and its alternates, one term is synonymous with the other.

Housing 22 may be made from either metallic or nonmetallic materials, and the various walls may be fastened together with nut and bolt combinations, screws, welds or other known fastening mechanisms. Side walls 28 are shown to have a bend 36 at the top edge with a flange 38 extending over and being spaced above top wall 32. Front wall 34 includes a top support member 40 and a front cover 42 connected together by a hinge 44. Top support member 40 fits between flange 38 and top wall 32. When front cover 42 is closed, front cover 42 extends between hinge 44 fastened to the forward edge of top support member 40 and bottom wall 26, as well as from side wall 28 to side wall 28. Front cover 34 is spaced forwardly from the front edges of side walls 28 to accommodate hinge mechanism for trays 24 and to provide for the routing of distribution jumper cable. Front wall 34 is openable by pivoting front cover 42 upwardly about hinge 44 and sliding top support member 40, hinge 44 and front cover 42 rearwardly between flange 38 and top wall 32. FIG. 2 shows housing 22 with front cover 42 open exposing two adjacent stacks of trays 24. The stacks of trays 24 are separated sufficiently far so that any one tray from one stack may be swung out without interferring with a tray from the other stack.

It is noted that a plurality of housings 22 may be vertically stacked as depicted in FIG. 1. Each housing 22 may be independently fastened to a frame (not shown) or an upper housing 22 may be stacked on a lower housing 46 and retained in place. In the latter case, the bottom wall 26 of the upper housing rests on flanges 38 of the lower housing.

An outside plant trunk cable 48 runs vertically along a stack of housings 22. Trunk cable 48 is held at clamp 50 fastened to sidewall 28 and a plurality of optical fibers are routed into tubes 54 as discussed hereinafter. Thus, as cable 48 extends along a stack of housings, a few fibers are routed into each housing, while the cable 48 is clamped to the sidewall of each housing. A three-sided shield 52 is fastened to sidewall 28 and provides a covering for cable 48 and the individual fibers routed into a housing 22. In a vertical stack of housings 22, shields 52 fit together to form a guideway.

Figure 3:
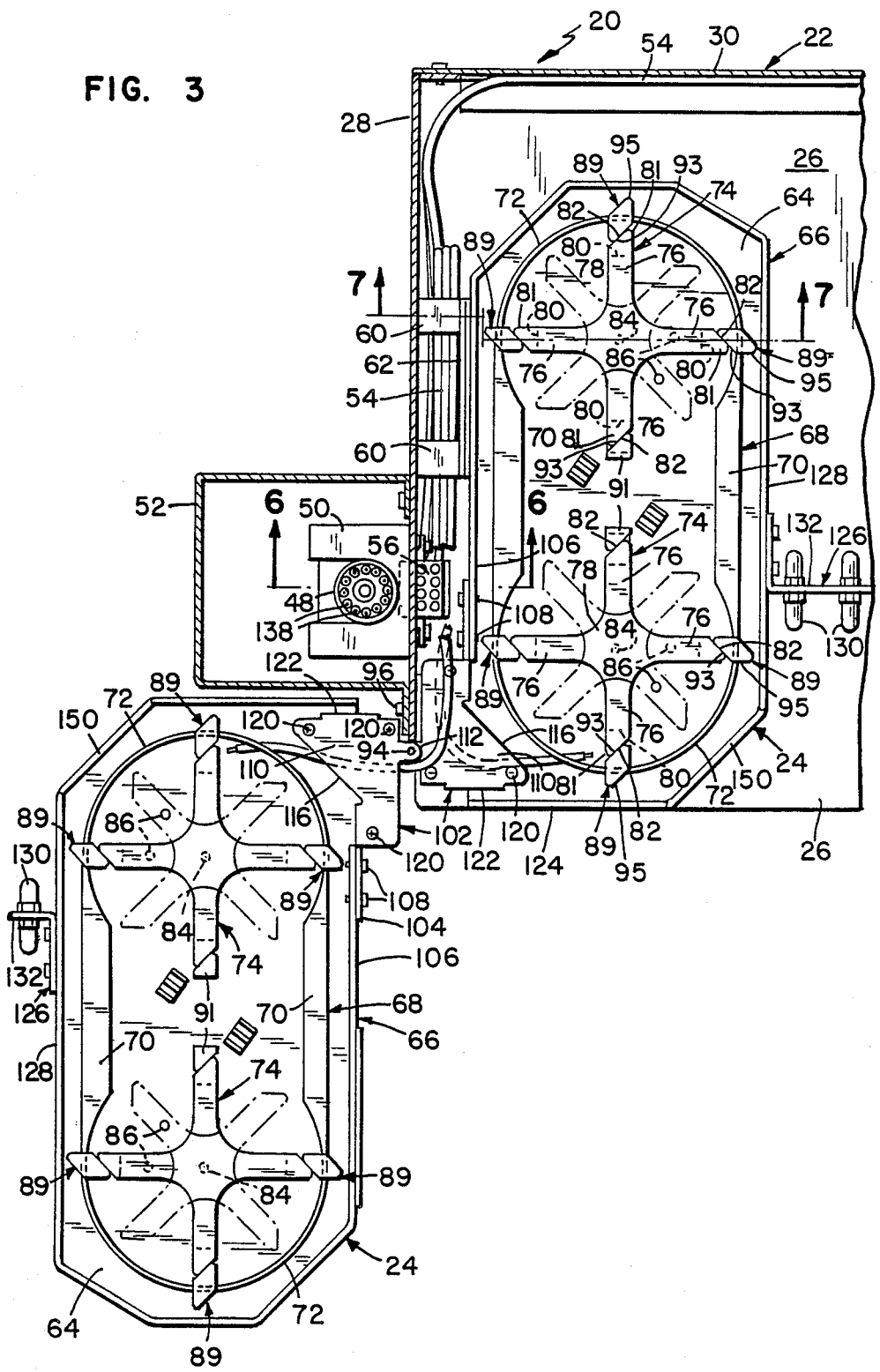
FIG. 3 is a cross-sectional view taken along line 3—3 of FIG. 2 with the upper tray moved to an access position and with a number of cables broken away for the sake of clarity.

A plurality of tubes 54 extend from a clamp 56 to the various trays 24 with one tube 54 going to each tray 24. The tubes 54 provide conduits for routing fibers from trunk cable 48 to trays 24. Clamp 56 is fastened in an opening 58 in side wall 28 in a region protected by shield 52. As shown in FIGS. 3 and 5, tubes 54 are routed from clamp 56 along sidewall 28. One half of tubes 54 are doubled back and directed into a different one of the stacked trays 24, along the sidewall 28 to which clamp 56 is attached, while the other one half of tubes 54 are routed along the back wall 30 and the opposite side wall 28 before being directed into a different one of stacked trays 24 on the opposite side of housing 22.

Figure 6:
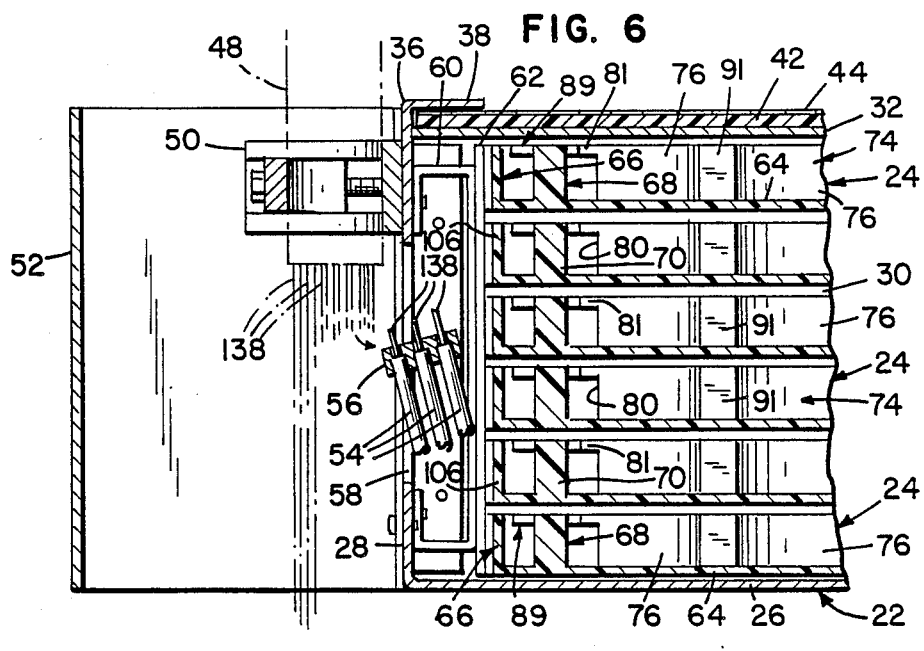
FIG. 6 is a cross-sectional view taken along line 6—6 of FIG. 3.

A pair of spaced apart bracket 60 are fastened to each sidewall 28 as shown in FIGS. 3 and 6. Each bracket 60 has an elongated, rectangular shape. Each bracket 60 is fastened with a screw or other known mechanism to sidewall 28. The longer side of rectangular bracket 60 is approximately vertical. Brackets 60 provide a space for routing tubes 44 and retaining them so that they do not interfere with the movement of trays 24. A magnetized sheet 62 is fastened to each pair of brackets 60 to provide a retaining mechanism for holding trays 24 in a storage position. Sheet 62 is applicable for metallic trays 24. It is understood, however, that if trays 24 are non-metallic or have a low magnetic permeability that another retaining mechanism can serve the same purpose.

Each tray 24 is the same. As shown in FIG. 3, a tray 24 generally has an elongated rectangular shape with three truncated corners. Alternatively, a tray 24 could be an elongatead oval or some other shape. A tray 24 has a bottom wall 64 and an outer sidewall 66 extending at approximately a right angle upwardly from the bottom wall 64. Sidewall 66 includes a number of openings for routing various fibers therethrough as described hereinafter.

Each tray 24 further includes an inner wall 68 extending upright from bottom wall 64. Inner wall 68 has an oval shape and is spaced inwardly from outer wall 66 to define an outer routing passage between inner wall 68 and outer wall 66. Inner wall 68 has longer sides 70 connecting the semicircular ends 72. Sides 70 are thicker than ends 72 to provide structural strength for inenr wall 68. Inner wall 68 also has openings therethrough for routing purposes as described hereinafter.

Inner wall 68 surrounds an area which includes a pair of spools 74. Each spool 74 is shown to have four prongs or legs 76 extending radially outwardly from a central core 78. The lower portions adjacent bottom wall 64 of each leg 76 have an end 80 generally circumferentially arcuate or straight and generally perpendicular to a radial line. The upper portions are retention tabs 81 which extend outwardly farther than the lower portions and have ends 82 inclined with respect to a radial line. Ends 80 of the lower portions are spaced from a semicircular end 72 of inner wall 68 to form a guideway for routing fiber as described hereinafter. The inclined ends 82 of the tabs 81 of legs 76 contact tabs 89 and 91 as also described hereinafter.

As shown in FIG. 7, each spool 74 is rotatably attached with a screw 84 or some other similar mechanism which provides a shaft about which rotation may take place. The axis of rotation is preferably at the center of the semicircular end 72 of inner wall 68. Each spool 74 may be rotated between a final storage position as shown in solid lines in FIG. 3 and a rotated access position as shown in broken lines in FIG. 3. Spaced apart protuberences 86 are formed in bottom wall 64 to mate with cavity 88 in one of legs 76 of spool 74 to retain spool 74 in the two indicated positions.

As shown in FIG. 3, three covering tabs 89 for each spool 74 are fastened to the upper edge of inner wall 68. A fourth tab 91 for cooperation with a spool 74 is fastened to a member (not shown) extending upwardly from bottom wall 64 along a line connecting the rotational axes of spools 74. Each tab has an inclined edge 93 for mating with and contacting the inclined ends 82 of tabs 81 of spool 74. Tabs 89 are located to be in line with the centerlines of legs 76 when one of legs 76 is centered on the line between the rotational axes of spools 74. Each tab 89 has a portion 95 which extends over the space between outer wall 66 and inner wall 68. Portion 95 does not extend completely to outer wall 66 since there must be sufficient space to press a jumper or distribution cable between portion 95 and outer wall 66. Thus, tabs 89 help retain cables stored between outer wall 66 and inner wall 68. Also, when spools 74 are in the storage position so that edges 82 and 93 are in contact, tabs 81 and 89 retain jumper cable or fiber from the trunk cable on spools 74. Each tab 91 forms a cover just like tabs 89 except tabs 91 need only extend toward a leg 76 and have an appropriate inclined edge for mating with the edge 82 of the leg 76.

Each tray 24 is rotatably attached to housing 22. As shown in FIG. 8, a hinge plate 90 with an end 92 turned arcuately outwardly to form a passage for receiving a hinge pin 94 is attached with nut and bolt combinations 96 to sidewall 28. A different hinge plate 90 is used for each tray 24. Since tray 24 is spaced from sidewall 28 due to brackets 60, bottom wall 64 extends sidewardly at the forward end of tray 24. That is, only the inward forward end of tray 24 is truncated. Bottom wall 64 includes a portion 98 which extends sidewardly beyond the side of tray 24 which contacts magnetic plate 62 and is squared off to mate with and not interfere with hinge plate 90. An ear 100 extends even further sidewardly from portion 98 so as to extend under arcuate end 92 of hinge plate 90. Ear 100 has an opening (not visible in the drawings) through which hinge pin 94 passes.

An upper support member 102 provides similar support for tray 24 as portion 98 and ear 100 of bottom wall 64. A detail of upper support member 102 is shown in FIG. 9 with cross sectional portions of member 102 shown in FIG. 8. Member 102 has a vertical wall 104 which extends along the portion 106 (see FIG. 8) of outer sidewall 66 which is nearest to and parallel to sidewall 28 of housing 22. Vertical wall 104 is fastened with rivits 108 or other known fastening mechanisms to portion 106. Member 102 includes a top wall 110 integral with vertical wall 104. Top wall 110 extends sidewardly in a rectangular shape which is similar to the shape of portion 98 of bottom wall 64. Top wall 110 includes an ear 112 for fitting over arcuate end 92 of hinge plate 90 and has an opening 114 therein for receiving hinge pin 94. The front portion of member 102 extends inwardly farther than the rear portion and has an angled edge 116 which would be aligned approximately with the truncated corner of tray 24 if the forward, sideward corner were truncated to match the other corners of tray 24. Member 102 is further attached to tray 24 at three spaced apart fastening mechanisms. As shown in FIG. 5, each fastening mechanism includes a spacer 118 between bottom wall 64 and top wall 110 of member 102. Screws 120 are passed through openings in both bottom wall 64 and top wall 110 and threaded into spacer 118. A second vertical wall 122 extends downwardly from top wall 110 of upper support member 102 along the forward edge of top wall 110 such that wall 122 is spaced rearwardly from portion 124 of outer wall 66 of tray 24. The space between wall 122 and portion 124 forms a passageway for routing distribution cable as described hereinafter. It is understood, as indicated previously, that tray 24 may be formed from various materials. Consequently, in a different embodiment, member 102 may be eliminated in favor of forming an equivalent structure integral with tray 24.

A right angle bracket 126 is fastened with screws or other known fastening mechanisms to the portion 128 of the outer wall 66 of tray 24 farthest from sidewall 28. Bracket 126 could equivalently be fastened to bottom wall 64. A pair of known fiber optic connectors 130 are attached to the outwardly extending leg 132 of bracket 126.

Figure 4:
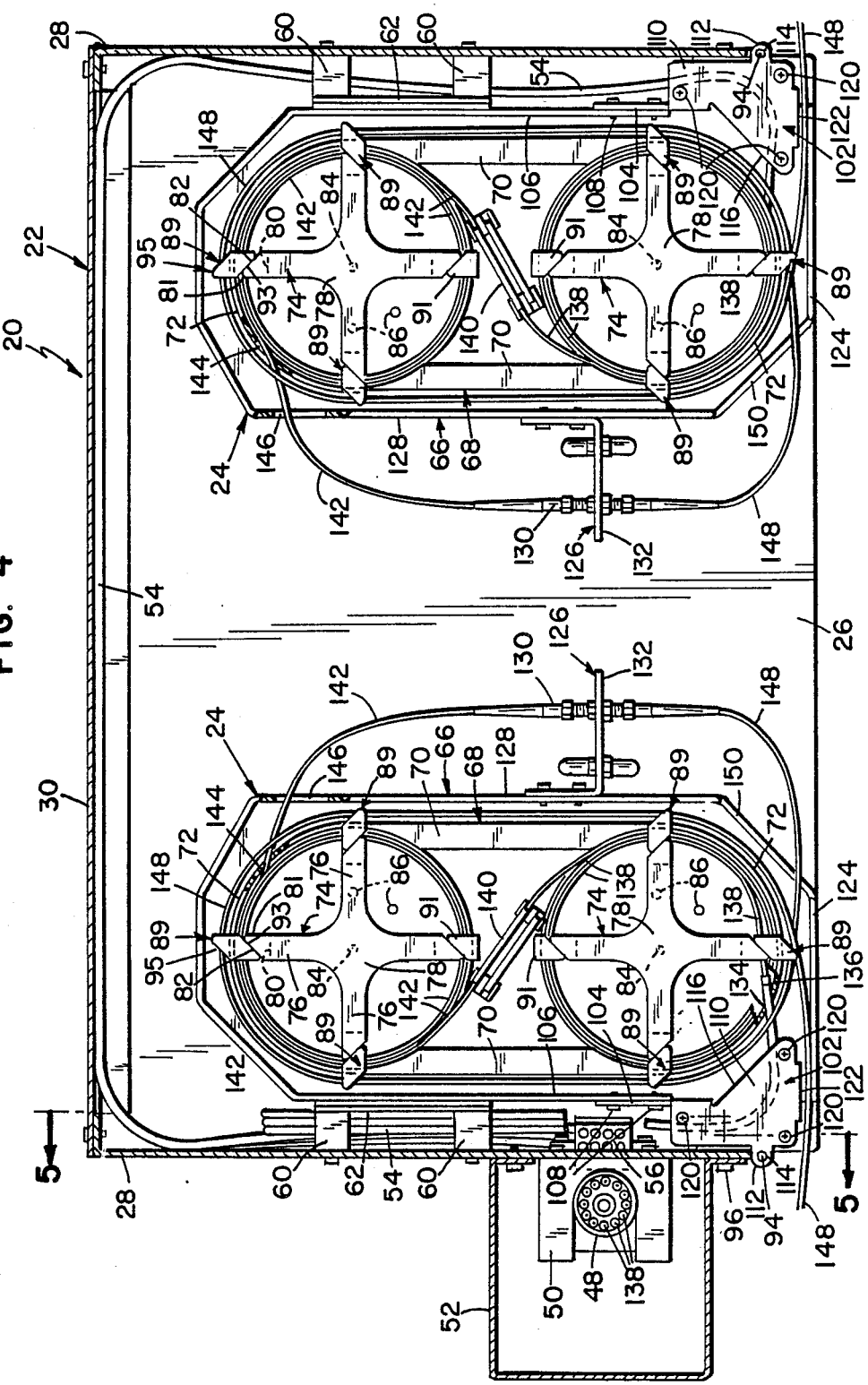
FIG. 4 is a cross-sectional view taken along line 4—4 of FIG. 2.

The routing of the various optical fibers of the various cables is shown most clearly in FIG. 4. Trunk cable 48 from the outside plant extends vertically through clamp 50. In a preferred embodiment, two stacks of trays 24 are included in a single housing 22. Trays 24 are separated as shown in both FIGS. 2 and 4 sufficiently so that any particular tray 24 may be swung or rotated outwardly from the storage space enclosed by housing 22 to an access position outside the storage space of housing 22 as shown in FIG. 3. As indicated hereinbefore, a plurality of tubes 54 equal in number to the number of trays 24 are attached at one end to bracket 56 and are routed as has been indicated one each to the various trays 24. As shown in FIG. 8, each tube extends through a space between vertical wall 104 of upper support member 102 and side wall 28 of housing 22. Each tube is then bent away from sidewall 28 so as to pass between the various spacers 178 and through the separation in outer wall 66 between portion 124 and portion 106 and also through an opening 134 in the forward semicircular end 72 of inner wall 68 to near the forward most extending leg 76 of spool 74. The end 136 of tube 54 may be fastened to tray 24, but it is not necessary and is not shown. An optical fiber 138 is routed through each of tubes 54.

With the forwardmost spool 74 rotated to the access position, any slack portion of fiber 138 is wrapped around spool 74 against the ends 80 of lower portion of legs 76 and beneath tabs 81. When forward spool 74 is rotated back to the storage position, fiber 138 is completely retained beneath tabs 81 and 89. The end of fiber 138 is connected at splice 140 to one end of a pigtail fiber 142. The splice is located in the region between spools 74 and attached to bottom wall 64. With the rearmost spool 74 in the rotated access position, any slack portion of pigtail fiber 142 is wrapped around it in a fashion similar to the slack portion of trunk cable 138 wrapped around the forwardmost spool 74. The other end portion of pigtail fiber 142 is then passed through opening 144 in the rearmost semicircular end 72 of inner wall 68 and through opening 146 near the rearward end of outer wall 66 to one of connectors 130 attached to bracket 126. An optical fiber 148 of either a jumper cable which is attached to a distribution cable or the optical fiber of the distribution cable itself is attached to the other end of connector 130. Fiber 148 or the cable in which it is located is passed through an opening 150 near the forward end of outer wall 66 and any slack portion is wrapped about inner wall 68 between inner wall 68 and outer wall 66 before being routed between vertical wall 122 of upper support member 102 and portion 124 of the forward end of outer wall 66.

In use, a trunk cable 48 is extended vertically along a stack of housings 22 and clamped into place by clamp 50 along one side of each housing 22. A fiber 138 from cable 48 is routed into each of tubes 54. The front wall 34 of housing 22 is opened by lifting cover 42 and sliding wall 34 rearwardly between flanges 38 and top wall 32. A particular tray on which one wishes to work is swung outwardly from the storage position to an access position. The fiber 138 is routed as indicated hereinbefore and spliced with pigtail 142. Pigtail 142 is routed as indicated previously and connected to connector 130. A fiber 148 from a distribution cable or a jumper connected to the distribution cable is also connected to connector 130. Fiber 148 is routed as indicated previously. Spools 74 are rotated closed and tray 24 is swung back into the storage position. After each of the trays have been serviced as desired, front wall 34 is moved back into the closed position.

Figure 10:
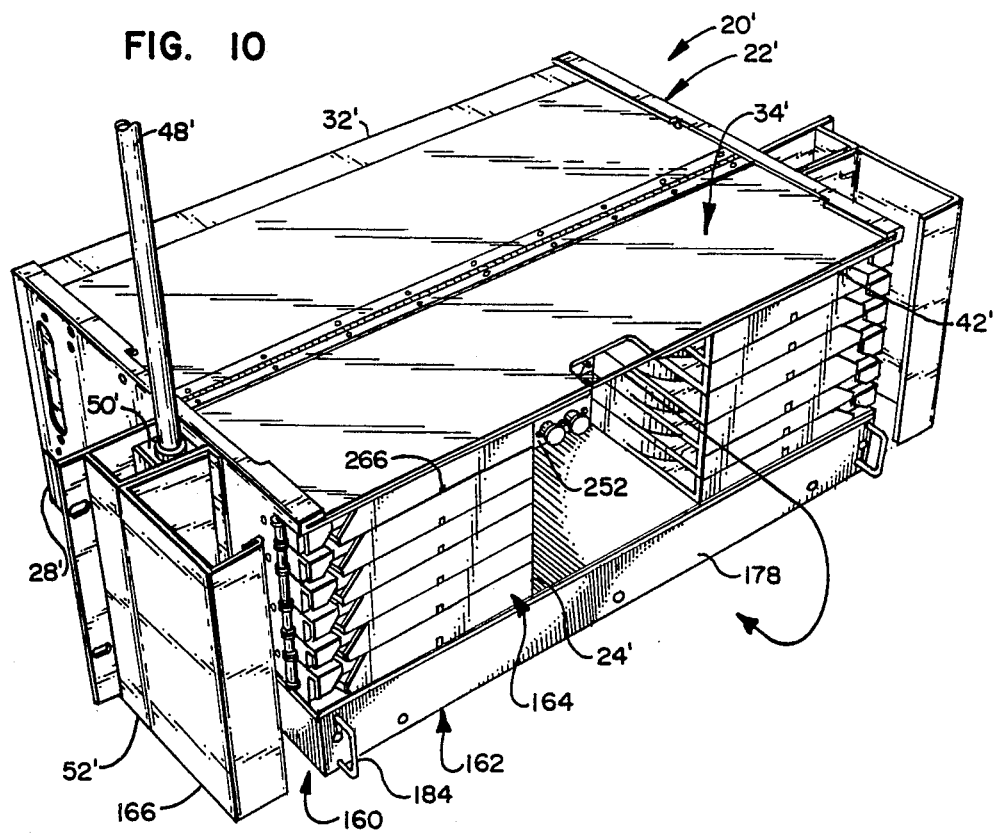
FIG. 10 is a perspective view of an alternate embodiment of apparatus in accordance with the present invention.

In another embodiment, which is actually the preferred embodiment, similar assemblies, subassemblies and components are identified by the same numbers as used hereinbefore, except the numbers are primed so as to distinguish between the two embodiments. As shown in FIG. 10, apparatus 20' includes a housing 22' and an enclosing frame 160 for holding a drawer 162. Housing 22' encloses and supports trays 24' and has a bottom wall 26', side walls 28', a back wall 30', a top wall 32', and a front wall 34' having an openable cover 42', all in a fashion similar to housing 22 of the earlier embodiment. Side by side stacks 164 of trays 24' are swingably supported by housing 22', generally similar to the earlier embodiment although mechanism differs as described hereinafter. Trunk cable 48' runs vertically along apparatus 20' and is held at clamp 50' within a three-sided shield 52' which forms a protected guideway for the cable. An additional three-sided shield 166 is attached to housing 22' at a location adjacent to shield 52' and also runs generally vertical. Shield 166 forms a second protected guideway, this one for distribution cables. It is pointed out that shields 52' and 166 may be attached on either side or both sides of housing 22'.

Figure 13:
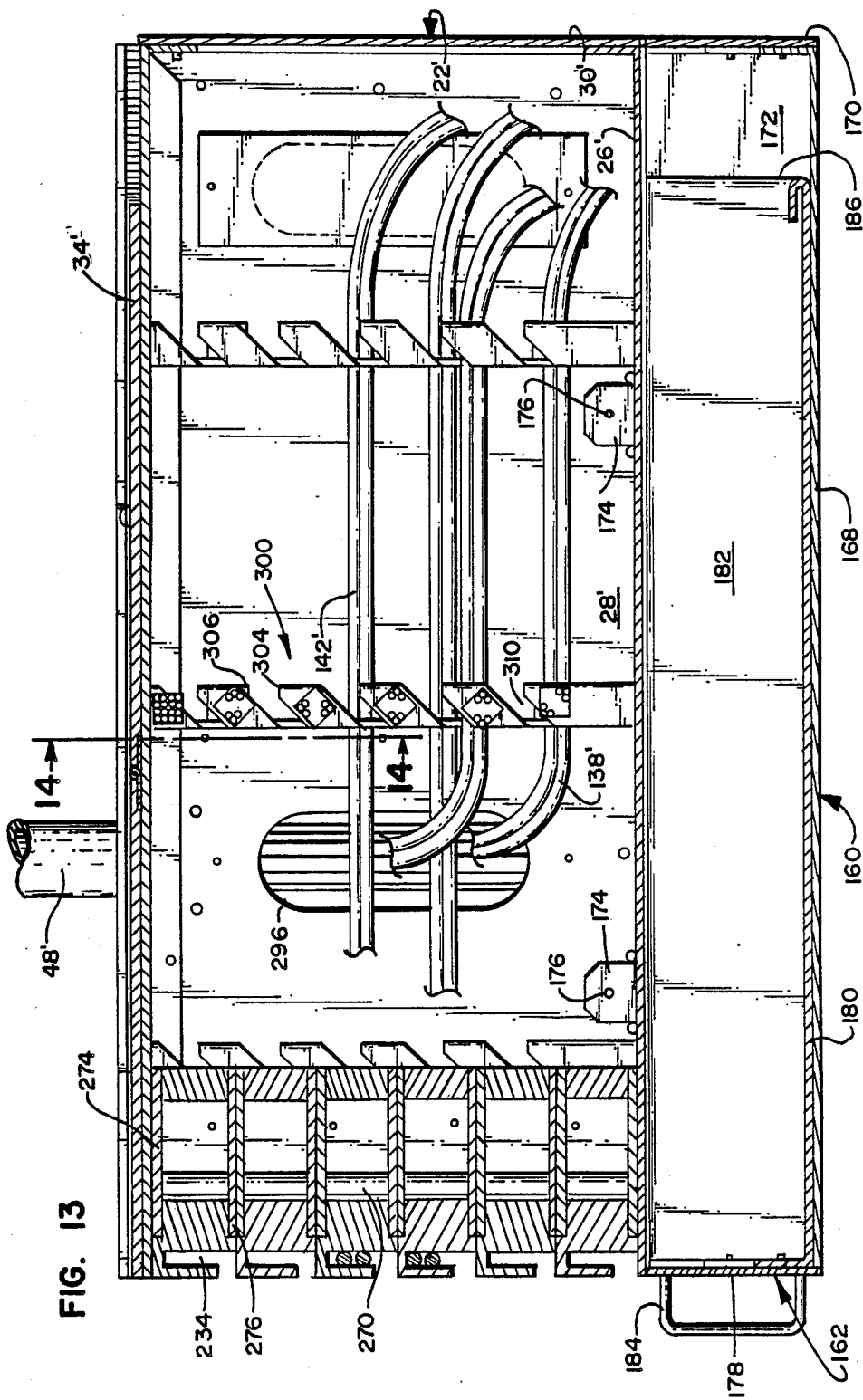
FIG. 13 is a cross-sectional view taken generally along line 13—13 of FIG. 11.

As shown in FIG. 13, enclosing frame 160 for drawer 162 includes a bottom wall 168, a back wall 170, and side walls 172. Each side wall 172 has a pair of tabs 174 which extend upwardly and somewhat inwardly to project through openings (not shown) in bottom wall 26' of housing 22'. Screws 176 are threaded through side walls 28' into tabs 174 to hold enclosing frame 160 to the bottom of housing 22'. It is noted that additional enclosing frames 160 and drawers 162 may be added in a similar fashion by inserting the tabs 174 of an additional frame 160 into openings (not shown) in the bottom wall of the installed enclosing frame 160.

Figure 12:
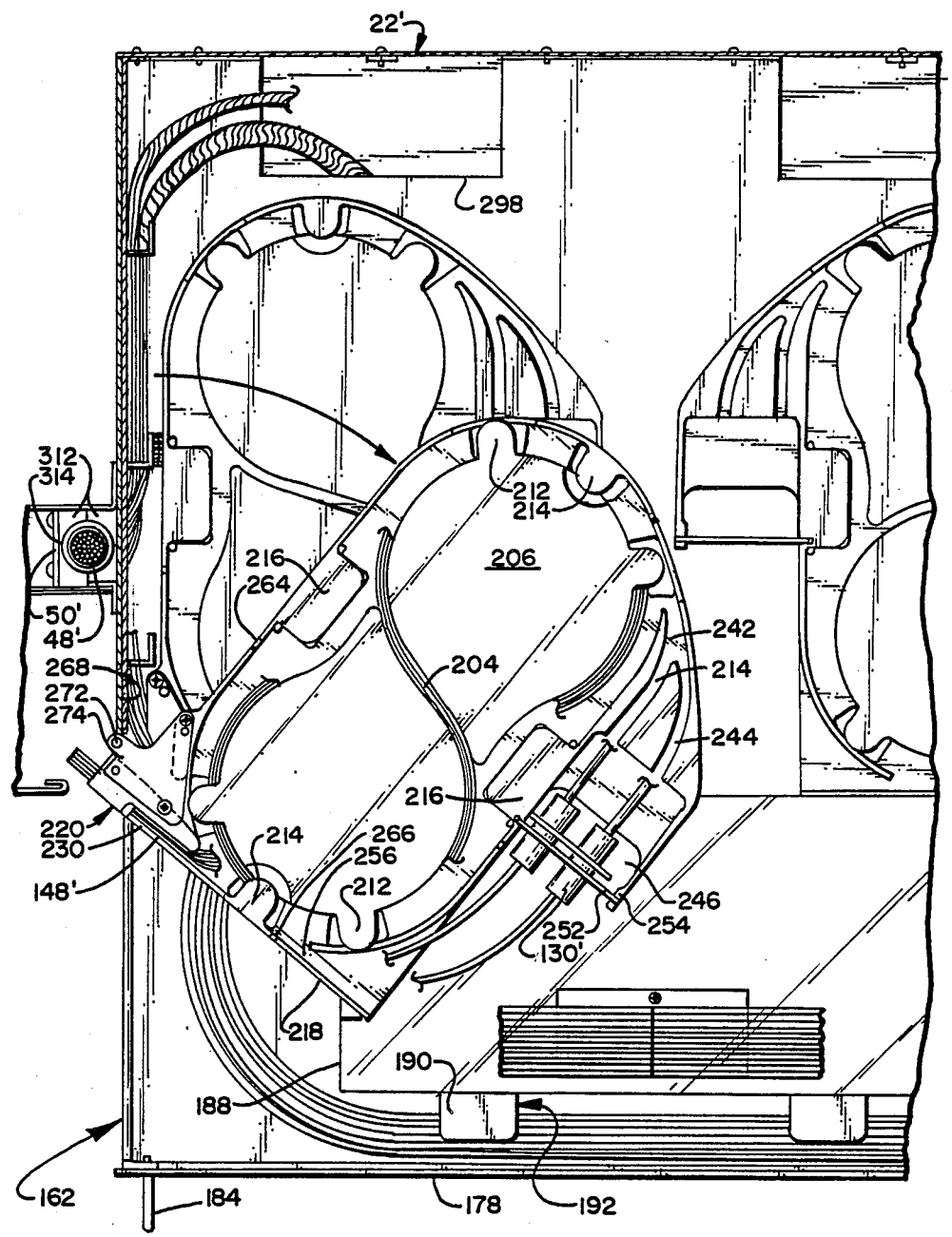
FIG. 12 is a cross-sectional view taken generally along line 12—12 of FIG. 11, where the drawer has been opened and one tray has been partially rotated out of the housing.

Drawer 162 includes a front wall 178, a bottom wall 180 and side walls 182. A handle 184 is attached to front wall 178. Drawer 162 extends loosely within enclosing frame 160 from side to side and from bottom wall 168 to bottom 26' of housing 22'. The back end 186 of drawer 162 is spaced forwardly from back wall 170 and is open to provide for fiber routing. As shown in FIG. 12, the interior of drawer 162 includes conventional mechanism 188 for splicing optical fibers together. Splicing mechanism 188 is preferably clamped near the center of drawer 162 with clamps 190 which also includes tabs 192 extending away from splicing mechanism 188 toward the side walls and front wall of drawer 162 in order to retain optical fiber 138' from trunk cable 48' and pigtail optical fiber 142', either of which may be wrapped about brackets 190 in order to store excess length. An additional bracket (not shown) may be used to prevent stored lengths of fiber from falling out the open back of drawer 162.

Housing 22' holds stacks of trays 24'. The details of a tray 24' are shown in FIGS. 16-17. FIG. 16 shows a top view, while FIG. 17 shows a bottom view. Tray 24' is preferably a one-piece molded part. Tray 24' has a top 194 generally defining a plane and a bottom 196, also generally defining a plane which is approximately parallel with the top plane. Using the top plane as a reference, surfaces and edges of tray 24' facing upwardly are either perpendicular to the top plane or not greater than 90 degrees from the perpendicular. Similarly, surfaces and edges facing downwardly from bottom 196, are either perpendicular to the top plane or not greater than 90 degrees from the perpendicular. In this way, the molding of tray 24' may be done using a pair of tools which travel toward and away from one another in directions perpendicular to the top plane.

Tray 24' is formed to have a generally oval outer side wall 198 which extends at approximately a right angle from the bottom 196. Tray 24' also includes an inner wall 200 extending upright from bottom 30 196. Inner wall 200 is spaced from outer wall 198 and defines a routing passage or channel 202 therebetween. Channel 202 forms an endless path generally in the shape of an oval having semi-circular ends and opposite sides. A second routing passage or channel 204 is formed through inner wall 200 and extends generally from one of the opposite sides to the other. The portions enclosed by channels 202 and 204 form flat surfaces 206 as a part of top 194. The regions beneath surfaces 206 are cavities having structure therein in the form of a plurality of spokes 208 radiating from hubs 210 near the center of each surface 206, said structure for providing support for inner wall 200 and surfaces 206. A pair of tabs 212 extend outwardly from each of surfaces 206 in the general region of the corners of tray 24'. Tabs 212 extend approximately to outer wall 198, although wall 198 in the region of tabs 212 is recessed, thereby providing a space between each tab 212 and outer wall 198 through which a fiber may be inserted. In addition, a tab 214 extends inwardly from outer wall 198 in a region near the rear end of tray 24' approximately midway between tabs 212 of a pair. A tab 214 also extends from front wall 218 toward inner wall 200. Tabs 214 extend approximately to inner wall 200, although inner wall 200 is recessed in the general regions near tabs 214 so that fibers may be pressed between inner wall 200 and a tab 214. In addition, larger rectangular tabs 216 extend inwardly from outer wall 198 near the center of the sides of oval shaped channel 202. As with the other tabs, there is space between tabs 216 and inner wall 200 to fit fibers therethrough. As shown in FIG. 17, there are openings in bottom 196 beneath each of tabs 212, 214 and 216 to provide for the forming of the tabs during the molding process.

Tray 24' has a flat front wall 218 which is especially convenient for attaching a sticker or otherwise providing a mechanism for identifying the circuit which is accessible within a particular tray. Wall 218 is tangent to the forward end of oval shaped channel 202 and forms a squared forward end of tray 24'. At a corner 220, generally where a straight walled side of outer wall 198 and front wall 218 would intersect, structure is formed to provide attachment to hinge mechanism 222 (see FIG. 15). The structure is essentially a pair of elongated posts 224, 226 oriented to form two legs of a triangle. Post 224 is generally parallel with front wall 218 and is spaced rearwardly from it. A passage 228 extends from channel 202 between front wall 218 and post 224 and runs generally parallel with front wall 218. Front wall 218 has a diagonal side edge 230 approximately midway along post 224 when viewed from the front. Sidewardly of edge 230, a covering tab 232 extends forwardly from post 224 and downwardly to appear to be an extension of front wall 218. Tab 232 has a diagonal edge 234 facing edge 230 so that a diagonal slot 236 (see FIG. 15) is formed between edges 230 and 234. In addition, the bottom 196 of passage 228 stops at the most sidewardly portion of edge 230 thereby allowing for easy insertion of a fiber into passage 228 by inserting it through 236 and under covering tab 232.

A second passage 238 is formed near a projected intersection of posts 224 and 226. Passages 228 and 238 provide for entry and exit of fibers to channel 202.

Generally daigonal from corner 220, is a portion 240 extending sidewardly from outer wall 198. Side portion 240 includes a third routing passage in the form of channel 242 which leads from channel 202 and separates into a pair of channels 244 leading to region 246 where connectors 130' are attached. Channel 242 and the pair of channels 244 are generally directed forwardly as they proceed away from channel 202.

Sidewardly extending portion 240 includes a cantilevered wall 248 spaced from outer wall 198. Each of walls 198 and 248 include small slots 250 across from each other and along the top and bottom edges. Bulkhead 252 (see FIG. 12) includes a leg 254 at each of its corners. Legs 254 fit in slots 250. Bulkhead 252 is easily installed and removed since cantilevered wall 248 is readily sprung away from wall 198 to allow easy insertion and removal of legs 254.

A fourth routing passage extends along front wall 218. An opening 255 is formed between outer wall 198 and front wall 218. Fiber proceeding from a connector 130' installed on bulkhead 252 may be routed in the fan-like region 257 between outer wall 198 and front wall 218 through opening 255 along the very forward portion of channel 202 or into and around channel 202 and out passage 228.

Trays 24' include a mechanism 256 which prevents the rotation of more than 90 degrees of one tray with respect to a next adjacent tray in a stack 164. The mechanism 256 includes a circular slot 258 in bottom 196. Slot 258 is centered on the rotational axis of hinge 222 when tray 24' is installed to hinge 222. At the side wall 198 end of slot 258, wall 198 extends downwardly to the bottom plane at the half of slot 258 farthest from the rotational axis. At the forward wall 218 end of slot 258, forward wall 218 extends downwardly to the bottom plane in the half of slot 258 nearest the rotational axis. Thus, an opening 260 is formed at the wall 198 end of slot 258 and an opening 262 is formed at the wall 218 end of slot 258. Directly above opening 260 rising above outer wall 198 is a protuberance 264, and directly above opening 262 rising above wall 218 is a protuberance 266. Protuberances 264 and 266 have a height no greater than the depth of openings 260 and 262. Thus, when a set of trays 24' are stacked as shown in FIG. 10, protuberance 266 fits in opening 262. When a tray 24' is rotated out of housng 22', protuberance 264 moves through slot 258 of the tray thereabove. As the rotating tray nears a 90° rotation with respect to next adjacent trays, protuberance 264 catches on the tray wall 218 above the rotating tray on the part of wall 218 which extends into slot 258. Similarly, protuberance 266 on the tray below the rotating tray catches the part of wall 198 of the rotating tray which extends into slot 258. Thus, the rotating tray is prevented from rotating more than 90° with respect to either of the tray above it or below it. This stop mechanism also functions to strengthen the trays as a stacked unit since the trays above and below a rotated tray help prevent it from being torqued with respect to the hinge and thereby broken.

Figure 15:
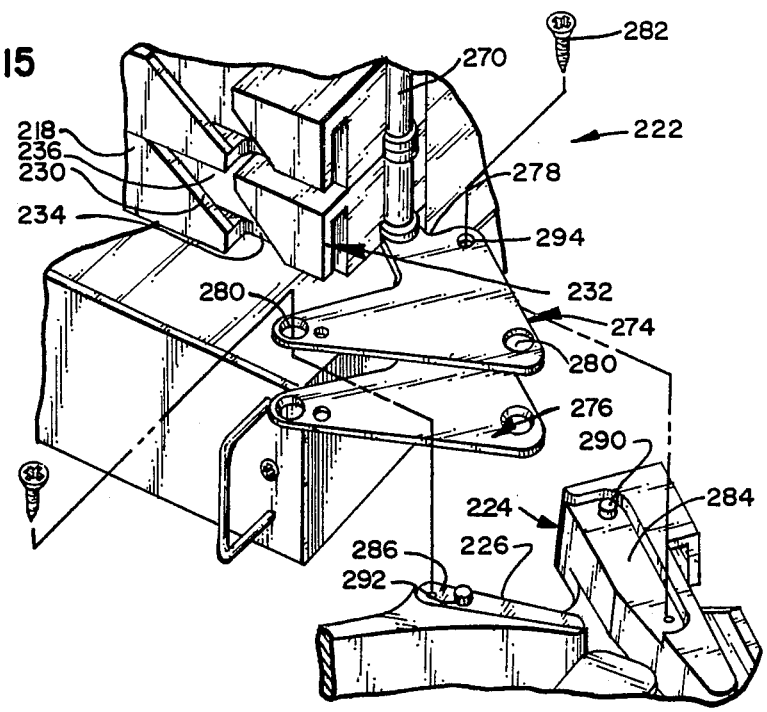
FIG. 15 is an exploded perspective view of a tray attached to a hinge of the type used in the alternate embodiment.
Figure 11:
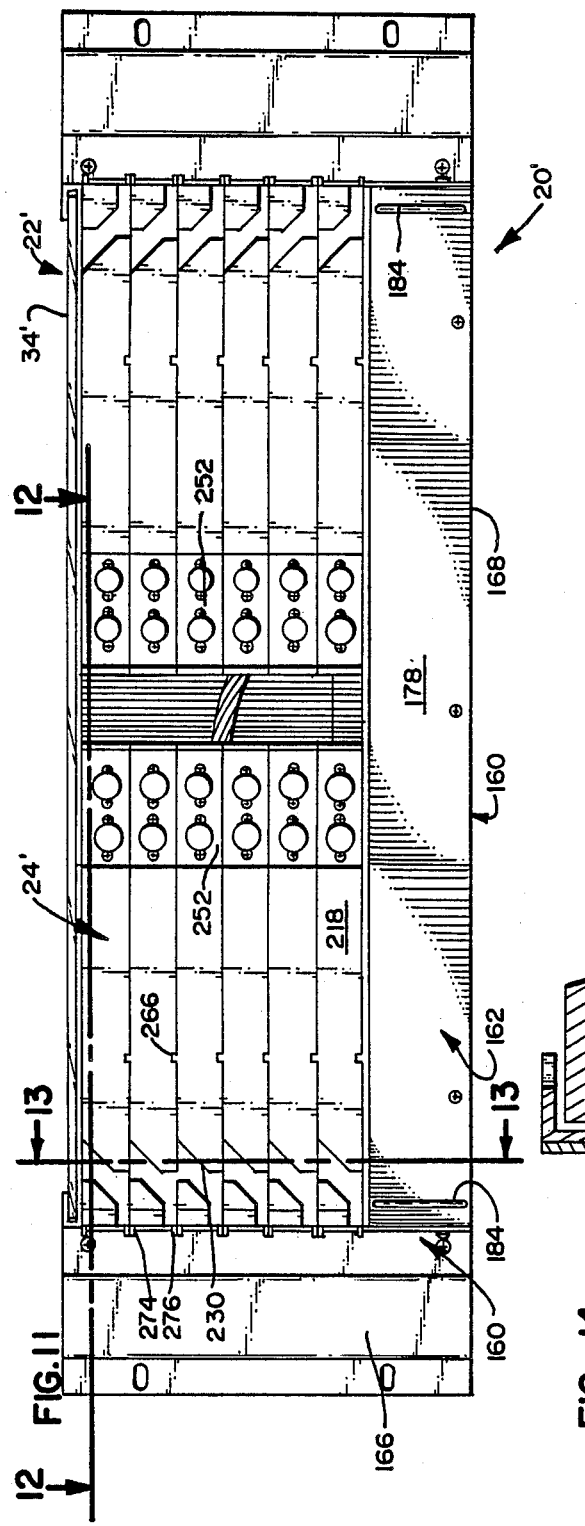
FIG. 11 is a front elevational view of the apparatus shown in FIG. 10.
Figure 14:
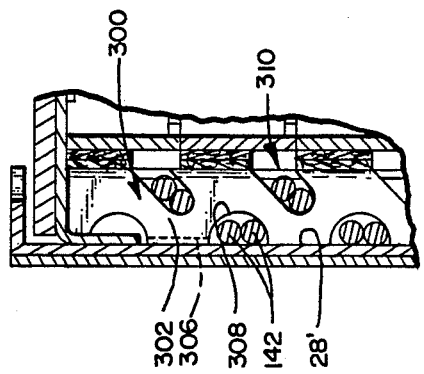
FIG. 14 is a cross-sectional view taken generally along line 14—14 of FIG. 13.

Hinge 222 includes a hinge plate 268 (see FIG. 12) with a plurality of spaced-apart, aligned sleeves 270 and a hinge pin 272 for fitting in the sleeves (see also FIG. 15). Each pair of holding plates 274 and 276 for each tray are spaced apart by a sleeve 270. A holding plate 276 for an upper tray and a holding plate 274 for a lower tray receive hinge pin 272 between each set of adjacent sleeves 270. Holding plates 274 and 276 are identical. A holding plate 274, for example, is generally triangular with an extension 278 near one corner. Extension 278 has an opening therein for receiving hinge pin 272. At the vertices farthest from extension 278, there are openings 280 for receiving screws 282. One of the screws each threads into a different of posts 224 and 226. Each of posts 224 and 226 have recessed portions 284 and 286 in the top and a recessed portion 288 in the bottom for receiving holding plates 274 and 276. A protusion 290, 292 extends outwardly from each recessed portion 284 and 286 in each post. Protrusion 290 is received in an opening 294 in the vertex near extension 278, while protrusion 292 is received in an opening 296 near the opening 280 for screw 282. Similarly situated protrusions extend on the bottom side of tray 24' and are received in similar openings in holding plate 276. Tray 24' is attached to holding plates 274 and 276 so that extension 278 is nearest to cover 232 at corner 220. Although screws are disclosed as an attaching mechanism for tray 24' to hinge 222, it is understood that screws are not needed and that a sufficient number and placement of protrusions from tray 24' and openings in holding plates 274 and 276 for receiving the protrusions will function equivalently. In fact, there is advantage to eliminating the screws in that then trays may be removed and installed even more quickly during assembly or replacement.

It is noted that a complete stack 164 of trays 24' may be assembled and held together with the use of a hinge 222. The hinge 222 advantageously holds holding plates 274 and 276 captive and in place as a result of sleeves 270 and pin 272. Trays 24' are easily inserted between a pair of holding plates 274 and 276 so that the protrusions are received in openings and the screws are threaded into place. A stack is readily assembled. The stack is attached to housing 22' by fitting hinge plate 268 just inside the front edge of a side wall 28' and inserting a plurality of screws through wall 28' to thread them into hinge plate 268.

Optical fibers 138' from trunk cable 48' enter housing 22' at opening 296 in a side wall 28'. Fibers 138' are routed along side wall 28' to an opening 296 in bottom wall 26' which leads to the open back of drawer 162. Pigtail fibers 142' are routed back through opening 298 to passages 238 in the various trays 24'. Fibers are ordinarily routed along both side walls so as to make use of both stacks 164 of trays 24'.

Brackets 300 retain fibers 138' and 142' against side walls 28' so that the fibers cannot be caught by a moving tray 24'. Brackets 300 are angled members having portions 302 extending outwardly from side wall 28' and portions 304 extending parallel to side wall 28'. A plurality of retaining tabs 306 extending sidewardly from portion 302 are screwed or otherwise attached to side wall 28'. Portion 302 has a plurality of semi-circular openings 308 which are next to side wall 28' and retain pigtail fibers 142' thereto. Portion 304 which extends parallel to side wall 28' includes a plurality of spaced-apart upwardly angled slots 310 therein. Slots 310 also extend at a downward angle into portion 302. In this way, a trunk cable fiber may be inserted into slot 10 in portion 302 and retained by a part of portion 304 extending upwardly therefrom. Hook and loop material is fastened to one of brackets 300 with matching material fastened to each of trays 24' in a stack 164 so as to provide a holding mechanism for trays 24' when they are located fully within the storage space of housing 22'. It is understood, however, that the retaining brackets and retaining mechanism for the trays is representative of the type of mechanisms usable for the functions.

In use, a trunk cable 48' is routed into the guide way formed by shield 52' and clamped at clamp 50'. Claim 50' preferably includes a rubber member having a circular opening. The rubber member is cut through the center of the circular opening such that the cut is parallel to side wall 28'. A pair of screws and a clamping plate force the two members together as the screws are threaded into side wall 28'. A rubber grommet 314 inserted in the opening in rubber member 312 may be used to further reduce the size of the opening to better match the size of the cable being clamped. Several sheaths holding optical fiber are separated from cable 50' and routed as indicated hereinbefore through opening 296 in side wall 28' and opening 298 near the back of bottom wall 26' into enclosing frame 160 and through the open back of drawer 162 into drawer 162. The fiber 138' is inserted into slots 310 of brackets 300 along side wall 28' to retain the fiber next to side wall 28' and away from entanglement with trays 24'. With drawer 162 open, fiber 138' from trunk cable 48' may be easily spliced at splicing mechanism 188 to a first end of pigtail fiber 142' leading to various trays 24'. Any excess length of trunk cable fiber 138' is wound around brackets 190 in drawer 162 for orderly storage.

Ordinarily, pigtail fibers 142' are pre-routed from drawer 162 to the various trays 24'. Pigtail fibers proceed from splice mechanism 188 through the open back of drawer 162 and opening 298 in bottom wall 26' of housing 22' along side wall 28' to passages 238 in the various trays 24'. The pigtail fibers are threaded through openings 308 in brackets 300 so as to be retained next to side wall 28' thereby being out of the way of fibers coming from trunk cable 48'.

Pigtail fiber 142' enters a tray 24' at passage 238 and is routed around oval channel 202 to store any excess length, as required. The second end portion of the fiber is routed from channel 202 through second channel 204 and back into channel 202 before proceeding into channel 242 and split channels 244. The second end of pigtail fiber 142' is then connected to connector 130'.

To accomplish the indicated routing, a tray may be detached from hinge 222. Alternately, an entire stack of trays 164 may be detached from housing 22' by unfastening hinge plate 268 from side wall 28'. A further alternative is to simply rotate a drawer outwardly from the storage space defined by housing 22' to expose the various channels. When placing fiber in channel 202, it is conveniently pressed between tabs 212 and outer wall 198, between tabs 214 and inner wall 200, and between tabs 216 and inner wall 200. The various tabs retain the fiber within the tray and prevent the fiber from flexing upwardly and becoming caught in a next adjacent tray. Channels 202, 204, 242, 244 provide gentle curves for the routed fiber. The present invention advantageously controls the bend radii of fibers, thereby maintaining low signal loss at various wave lengths, especially long wave lengths.

The pigtail fiber 142' is connected at its second end to one part of connector 130' which is fastened to a removable bulkhead 252. Advantageously, the easily removable bulkhead 252 provides for rapid change of connectors from one style to another if necessary. It is also noted that the present invention may have the further use of routing trunk cable fiber directly into a tray 24' all the way to a field installable connector 130' at bulkhead 252.

A distribution fiber 148' is then connected to the circuit at connector 130' and routed from connector 130' through opening 255 and around oval channel 202 for storage, if desired, before exiting tray 24' at passage 228 into the quideway formed by shield 166.

With the various fibers routed and retained and the splices and connections completed, the drawer 162 is closed and all trays 24' are swung back into housing 22' and cover 34' is moved to close the front of housing 22'.

With a minor modification, apparaus 20' can also be used just to store cable or fiber, usually a pigtail cable or fiber. It is clear that a single tray 24' could be used to store a fiber simply by removing shield 166, if necessary, and routing the fiber into passage 228 and routing it about channels 202 and 204 before directing it out again from passage 228.

Figure 18:
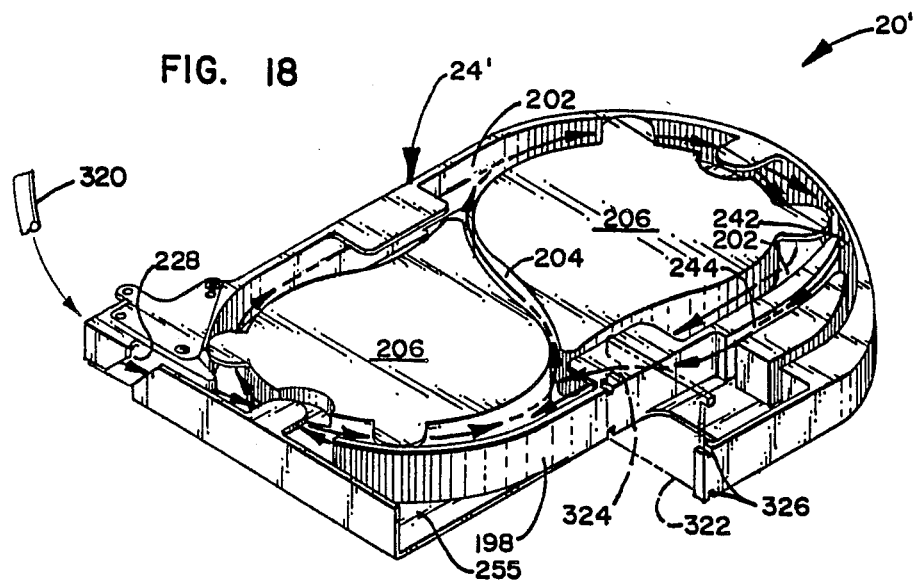
FIG. 18 is a perspective view of the lower tray showing fiber routing when two or more trays are used simply for storage.
Figure 19:
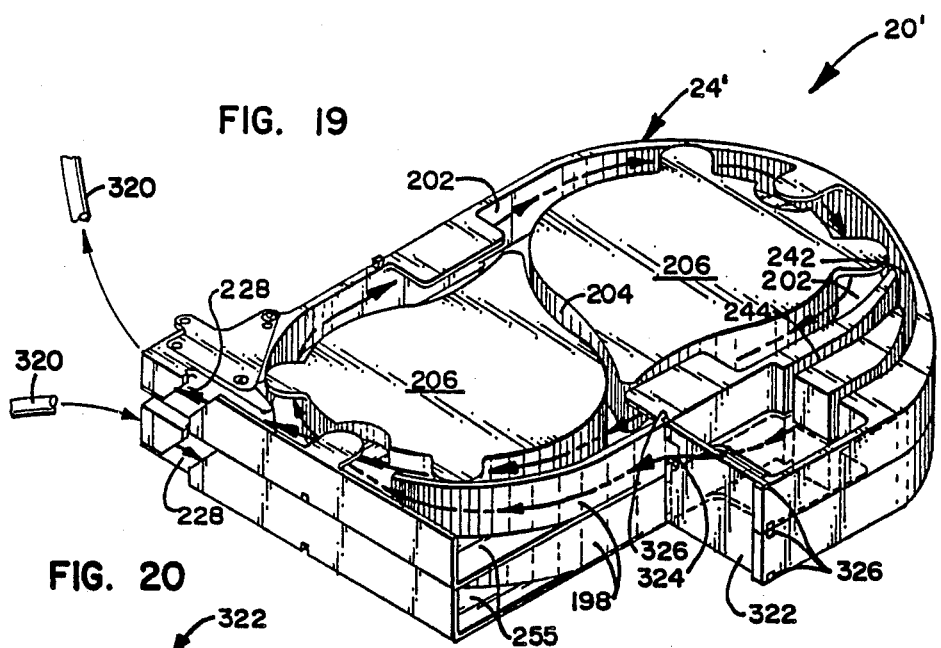
FIG. 19 is a perspective view of a pair or trays which are used only for storing fiber.
Figure 20:
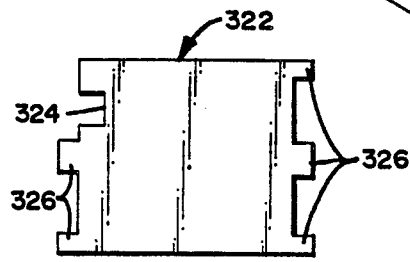
FIG. 20 is a front elevational view of a bulkhead for holding two trays together as shown in FIG. 19.

Apparatus 20' may also, however, be used to store a cable or fiber of length such that more than one tray is needed to store the entire length, for example, a pair of trays. In this case, shield 166 is again removed, if necessary. Also bulkhead 252 and connectors 130' attached thereto are removed from the trays which are to be used to store the fiber. With only the lower of the trays which are to be used for storage swung to the access position, blank bulkhead 322 is installed on it. Note that legs 326 engage slots 250 to hold bulkhead 322 in the lower tray. Bulkhead 322 has legs along its outer edge to engage slots 250 in walls 248 of both trays, but preferably only has legs to engage slots 250 of the lower tray along its inner edge. With reference to FIG. 18, fiber 320, probably a pigtail fiber, is routed into passage 228 (see FIG. 16). The fiber is then wrapped around tray 24' in channel 202. Preferably, on the first wrap, fiber 320 is passed through channel 204. That reverses the direction of the fiber so that when tray 24' is filled, fiber 320 may be directed out channel 242 and preferably the channel 244 nearest outer wall 198. It is noted that if the wrapping of the fiber in tray 24' is done properly, a minimum radius equal to the radius of surface 206 will be maintained.

When the lower of trays 24' is filled, the upper tray 24' of the pair may be swung directly over the lower tray. Bulkhead 322 is snapped into place by springing wall 248 outwardly until leg 326 engages slot 250. Bulkhead 322 includes an opening 324 preferably near the outer wall 198 of upper tray 24'. Fiber 320 is then routed through opening 324 and into upper tray 24' through opening 255. Fiber 320 is wrapped in channel 202 of upper tray 24' as much as desired and then directed out through passage 228.

With respect to this latter storage application, it is understood that additional trays beyond a pair as just described may be used if necessary and in a similar fashion. Bulkhead 322 would simply be longer and include more openings 324.

Apparatus 20 and 20' are particularly efficient organizers of fibers distributed from an outside plant trunk cable to numerous distribution cables. The apparatus contains all the fibers and eliminates any "rat's nest" situations. The apparatus is completely front accessible and, consequently, makes efficient use of space through the elimination of aisles along the sides or back of a stack of equipment. The preferred embodiment of apparatus in accordance with the invention has been described with particularity. It is understood, however, that a number of equivalencies in structure and function are possible. Consequently, it is understood that changes made, especially in matters of shape, size, and arrangement, to the full extent extended by the general meaning of the terms in which the appended claims are expressed, are within the principle of the invention.

What is claimed is:

1. Distribution apparatus for cross connecting first optical fibers from a trunk cable to second optical fibers from a plurality of distribution cables, said apparatus comprising:
    a housing having members which define a storage space;
    a tray for receiving a length of each of said first and second optical fibers;
    means for mavably attaching said tray to said housing wherein said tray may be moved between a storage position in said storage space and an access position generally outside said storage space; and
    means, contained within said storage space, for interconnecting one of said first fibers from said trunk cable to one of said second fibers from one of said distribution cables, said interconnecting means including a third pigtail optical fiber, first means for connecting said third fiber to said one first fiber from said trunk cable and second means for connecting said third fiber to said one second fiber of said one distribution cable, said third fiber also including a length being received and stored in said tray.

2. Apparatus in accordance with claim 1 wherein said tray includes a bottom wall and a generally oval outer sidewall extending at approximately a right angle from said bottom wall, said sidewall including a plurality of openings for routing at least two of said one first fiber, said one second fiber and said third fiber therethrough.

3. Apparatus in accordance with claim 2 wherein said tray further includes an inner wall extending upright from said bottom wall, said inner wall being spaced from said outer wall to define a first routing passage therebetween.

4. Apparatus in accordance with claim 3 wherein said inner wall surrounds an area, said tray further including a pair of spools in said area and means for fastening said spools to said tray, said spools being spaced from each other and having portions spaced from said inner wall to define a second routing passage between said spools and between said spools and said inner wall.

5. Apparatus in accordance with claim 4 wherein said tray also includes a plurality of first covering tabs attached to said inner wall, said covering tabs partially retaining at least one of said one first fiber, said one second fiber and said one third fiber in at least one of said first and second routing passages.

6. Apparatus in accordance with claim 5 wherein said spools include second covering tabs for mating with said first covering tabs so as together to completely cover over portions of said second routing passage, said spool fastening means including means for rotating said spools in order to separate said first and second covering tabs.

7. Apparatus in accordance with claim 4 wherein said interconnecting means includes first means for fastening said first connecting means to the bottom wall of said tray within the area enclosed by said inner wall and second means for fastening said second connecting means to one of the outer sidewall and the bottom wall of said tray.

8. Apparatus in accordance with claim 1 wherein said housing includes within said storage space means for containing said first connecting means, said interconnecting means including means for holding said second connecting means adjacent to said tray, said third fiber extending between said first and second connecting means.

9. Apparatus in accordance with claim 8 wherein one of said members of said housing is a wall, said apparatus also including means for clamping said trunk cable to said housing and means, attached to said wall, for retaining a portion of said first fiber against said wall as said first fiber extends between said clamping means and said containing means and for retaining a portion of said third fiber against said wall as said third fiber extends between said containing means and said tray.

10. Apparatus in accordance with claim 4 wherein said tray includes a plurality of covering tabs attached to one of said inner and said outer walls, said tabs extending generally over said first routing passage to removably retain one of said first, second and third fibers therein.

11. Distribution apparatus for cross conencting first optical fibers from a trunk cable with second optical fibers from a plurality of distribution cables, said apparatus comprising:
a walled housing enclosing a storage space, said housing having an openable front wall for exposing said storage space;
a plurality of trays;
means for swingably attaching each of said trays to said housing, said trays being moveable between said storage space through said front wall when opened to an access position in space substantially outside said storage space;
means, attached to said housing for routing a first fiber from said trunk cable to each of said trays;
a plurality of pigtail fibers, at least one pigtail fiber for each of said trays;
each of said trays including first means for storing a slack portion of at least one of said trunk cable fibers, each of said trays further including second means for storing a slack portion of said at least one pigtail fiber;
first means, attached to each of said trays, for connecting said at least one trunk cable fiber to said at least one pigtail fiber;
second means, attached to each of said trays, for connecting said at least one pigtail fiber to said at least one second fiber in one of said distribution cables.

12. Apparatus in accordance with claim 11 including means for clamping said trunk cable to said housing.

13. Apparatus in accordance with claim 11 including third means in each of said trays for storing a slack portion of said one second fiber.

14. Apparatus in accordance with claim 11 wherein said tray attaching means includes a hinge pin, said trays each including openings for said pin whereby said trays are rotatable about said pin.

15. Apparatus in accordance with claim 12 wherein said routing means includes a clamp attached to said housing near said trunk cable clamping means, and a plurality of tubes, each of said tubes extending from said clamp to a different one of said trays.

16. Distribution apparatus for cross connecting first optical fibers from a trunk cable with second optical fibers from a plurality of distribution cables, said apparatus comprising:
a walled housing enclosing a storage space;
a drawer;
means for enclosing said drawer;
means for attaching said enclosing means to said housing;
said housing and said enclosing means defining a storage space, said drawer having a first position in said storage space, said drawer being slideable outwardly to a second position substantially outside said storage space;
a plurality of trays;
means for attaching said trays to said housing, said attaching means including means for moving each tray between said storage space and an access position in space substantially outside said storage space;
first means for routing each of said first fibers from said trunk cable to said drawer;
a plurality of pigtail fibers;
means for splicing a first end of each of said pigtail fibers to a different one of said first fibers, said splicing means being contained in said drawer;
means, attached to each of said trays, for connecting a second end of each of said pigtail fibers to a different one of said second fibers;
second means for routing each of said pigtail fibers from said splicing means through one of said trays to said connecting means; and
third means for routing each of said second fibers through one of said trays to outside said storage space of said housing.

17. Apparatus in accordance with claim 16 wherein each of said second routing means includes a first channel in said one tray and wherein each of said third routing means includes a second channel in said one tray, said first channel for receiving and storing at least a portion of one of said pigtail fibers, said second channel for receiving and directing said second fiber from said connecting means to outside said housing.

18. Apparatus in accordance with claim 16 wherein each of said trays has a top and a bottom, said top defining a plane, said trays including surfaces and edges being one of perpendicular to said plane and not greater than 90 degrees from perpendicular when viewed from said top and one of perpendicular to said plane and not greater than 90 degrees from perpendicular when viewed from said bottom, whereby each of said trays may be molded using a pair of tools which travel toward and away from one another in directions perpendicular to said plane.

19. Apparatus in accordance with claim 16 wherein said housing has opposite sides and said apparatus further includes first means for guiding said trunk cable along one of said sides and second means for guiding said distribution cables along one of said sides.

20. Apparatus in accordance with claim 16 wherein said tray moving means includes means for stacking into a stack a plurality of trays, said attaching means providing for attaching and detaching from said housing said stack as a unit.

21. Apparatus in accordance with claim 20 wherein said moving means includes means for rotating all of said trays in said stack about an axis, said stacking means including means for preventing one tray from being rotated more than 90 degrees with respect to a next adjacent said tray.

22. Apparatus in accordance with claim 20 wherein said stacking means includes a hinge plate with a plurality of spaced-apart, aligned sleeves and a hinge pin for fitting in said sleeves, said stacking means further including a pair of holding plates for each tray, each pair of said holding plates being held by said hinge pin and being separated by one of said sleeves, one of said trays being received between each of said pairs of holding plates and being held by each, said tray attaching means attaching said hinge plate to said housing.

23. Apparatus in accordance with claim 22 wherein said housing has a front and said trays have a corner and an arcuate side diagonally opposite from said corner, each of said pairs of holding plates being attached to one of said trays at said corner, said apparatus including a pair of adjacent stacks of trays, each of said stacks being attached to said housing at opposite sides of said front of said housing, said arcuate sides allowing said stacks to be located nearer to one another than an angled corner would allow while also allowing each of said trays to rotate out of said storage space past said adjacent stack.

24. Apparatus in accordance with claim 23 wherein said first guiding means includes means for clamping said trunk cable to said one side, said clamping means including pliable jaws and a pliable grommet whereby cables of various diameters are readily held.

25. Distribution apparatus for storing optical fibers, comprising:
a housing having members which define a storage space;
a plurality of trays with each having an endless main passage for routing at least one of said optical fibers therein, each of said trays having an outer wall and an entry opening in said outer wall through which said one optical fiber may be routed to enter or to exit with respect to said main passage,
said main passage in each of said trays having generally opposite sides, each of said trays also including a second routing passage extending generally from one of said opposite sides to the other, each of said trays further including a sidewardly extending portion having a third routing passage formed therein, said third routing passage having an open end, said plurality of trays including first and second trays vertically stacked and adjacent with respect to one another;
means for movably attaching each of said trays to said housing wherein each of said trays may be moved between storage position in said storage space and an access position generally outside said storage space; and
means for connecting a pair of said trays together in stacked alignment and means for routing said one fiber from one tray to the other for storage in both,
said connecting means including a bulkhead facing said open end of said third routing passage of each of said first and second tray, said bulkhead holding said first and second trays together.

26. Apparatus in accordance with claim 25 wherein each of said trays has a traverse opening on a side of said tray generally opposite said entry opening, said bulkhead also having an opening for allowing said fiber stored in said first tray to pass from said open end of said third routing passage of said first tray through said bulkhead opening to said traverse opening in said second tray.

27. Apparatus in accordance with claim 26 wherein said first and second trays include means for detachably snapping said bulkhead thereto.

28. A method of cross connecting an optical fiber from a trunk cable to an optical fiber from a distribution cable, said method comprising the steps of:
clamping a plurality of fibers from a trunk cable to a side of a housing;
swinging one of a plurality of trays movably attached to said housing through an open front wall of said housing to provide easy access to said one tray;
routing one of said trunk cable fibers from said clamp to said one tray;
connecting said one trunk cable fiber to a pigtail fiber attached to a first connector attached to said one tray;
connecting said distribution cable fiber to said pigtail fiber attached to a second connector attached to said one tray;
routing said distribution cable fiber through said one tray; and
swinging said one tray back into said housing.

29. A method of cross connecting a first optical fiber from a trunk cable to a second optical fiber from a distribution cable, said method comprising the steps of:
guiding said trunk cable along a side of a housing;
routing a plurality of first fibers from said trunk cable through a first opening in said side of said housing to a drawer containing means for splicing each of said first fibers to first ends of different pigtail fibers;
splicing in said drawer each of said first fibers to the first ends of different pigtail fibers;
swinging selectively trays movably attached to said housing out of and back into said housing to provide access to said trays;
connecting one of said second fibers at each of different connecting means to the second end of different ones of said pigtail fibers, said pigtail fibers being routed from said splicing means in said drawer to first channels in different ones of said trays, and thereafter to means for connecting a second end of said pigtail fiber to one of said second fibers from said distribution cables;

routing each of said second fibers through a second channel in different ones of said trays and through a second opening in said housing; and closing said drawer and swinging said trays back into said housing.

* * * * *